United States Patent
Wilkinson

(10) Patent No.: US 10,395,206 B2
(45) Date of Patent: Aug. 27, 2019

(54) REFRIGERATING HOME DELIVERIES

(71) Applicant: Walmart Apollo, LLC, Bentonville, AR (US)

(72) Inventor: Bruce Walter Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 451 days.

(21) Appl. No.: 15/194,251

(22) Filed: Jun. 27, 2016

(65) Prior Publication Data

US 2016/0379162 A1  Dec. 29, 2016

Related U.S. Application Data

(60) Provisional application No. 62/186,181, filed on Jun. 29, 2015.

(51) Int. Cl.
*G06Q 10/08* (2012.01)
*G09B 19/00* (2006.01)
*G06Q 30/06* (2012.01)

(52) U.S. Cl.
CPC ..... *G06Q 10/0832* (2013.01); *G09B 19/0092* (2013.01); *G06Q 10/087* (2013.01); *G06Q 10/0833* (2013.01); *G06Q 10/0838* (2013.01); *G06Q 10/08355* (2013.01); *G06Q 30/0631* (2013.01)

(58) Field of Classification Search
CPC .................................................. G06Q 10/0832
See application file for complete search history.

(56) References Cited

U.S. PATENT DOCUMENTS

| 6,536,189 | B1 | 3/2003 | Murray | |
| 7,156,290 | B2 * | 1/2007 | Stemmle | B65D 27/30 235/375 |
| 7,621,404 | B2 | 11/2009 | Murray | |
| 8,696,151 | B1 | 4/2014 | Barakat | |
| 2004/0030882 | A1 * | 2/2004 | Forman | G06F 9/445 713/100 |
| 2004/0243353 | A1 * | 12/2004 | Aghassipour | G06Q 10/047 702/187 |

(Continued)

OTHER PUBLICATIONS

Punakivi, Mikko, Solving the last mile issue: reception box or delivery box?, 2001, International Journal of Physical Distribution and Logistics Management 31, No. 6, pp. 427-439 (Year: 2001).*

*Primary Examiner* — Kevin H Flynn
*Assistant Examiner* — Wayne S. Murray
(74) *Attorney, Agent, or Firm* — Fitch, Even, Tabin & Flannery LLP

(57) ABSTRACT

Deliveries of meal ingredients to a user are made in a crate and retrieval times of the crate are detected, such as by detecting input of a code to the crate or detecting proximity of a mobile device of a user to the crate. Retrieval times are used to train a retrieval model for the user. The amount of refrigerant (e.g. ice) required for subsequent deliveries is estimated based on a period between an expected delivery time and an expected retrieval time determined from the retrieval model as well as expected weather conditions during the period. A pick list for the meal ingredients is output and includes the amount of refrigerant as an item to be retrieved for the delivery.

18 Claims, 3 Drawing Sheets

(56) References Cited

U.S. PATENT DOCUMENTS

| | | | |
|---|---|---|---|
| 2006/0224398 A1* | 10/2006 | Lakshman | G06Q 10/08 705/333 |
| 2008/0086374 A1 | 4/2008 | Aitken | |
| 2013/0088323 A1* | 4/2013 | Ryan | G06Q 10/08 340/5.7 |
| 2013/0171304 A1* | 7/2013 | Huntley | G06Q 50/00 426/231 |
| 2014/0279665 A1* | 9/2014 | Lievens | G06Q 10/02 705/339 |
| 2014/0280193 A1 | 9/2014 | Cronin et al. | |
| 2015/0060440 A1* | 3/2015 | Lippold | B65D 81/3811 220/1.5 |
| 2015/0178818 A1* | 6/2015 | Foster | G06Q 30/06 705/26.81 |

\* cited by examiner

REFRIGERATING HOME DELIVERIES

CROSS-REFERENCE TO RELATED APPLICATIONS

This application claims the benefit of U.S. Provisional Patent Application 62/186,181, filed Jun. 29, 2015, and titled "Refrigerating Home Deliveries", the entire contents of which are hereby incorporated herein by reference.

BACKGROUND

Field of the Invention

This invention relates to systems and methods for delivering meal ingredients to customers.

Background of the Invention

Cooking delicious meals from basic ingredients is a great way to eat healthy. Trying out new recipes and enjoying the results is also enjoyable for many people. For people that work long hours or have small children, it may be difficult to find the time to buy fresh ingredients, even if one has the time to actually cook the meal. Likewise, it may take considerable time to review cooking magazines or recipe websites in order to find new recipes to try. A person may need to actually make many recipes before finding one that actually is suitable for the person's tastes.

The systems and methods described herein below provide an engine that invokes delivery of meals that have a high likelihood of satisfying a person's tastes.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
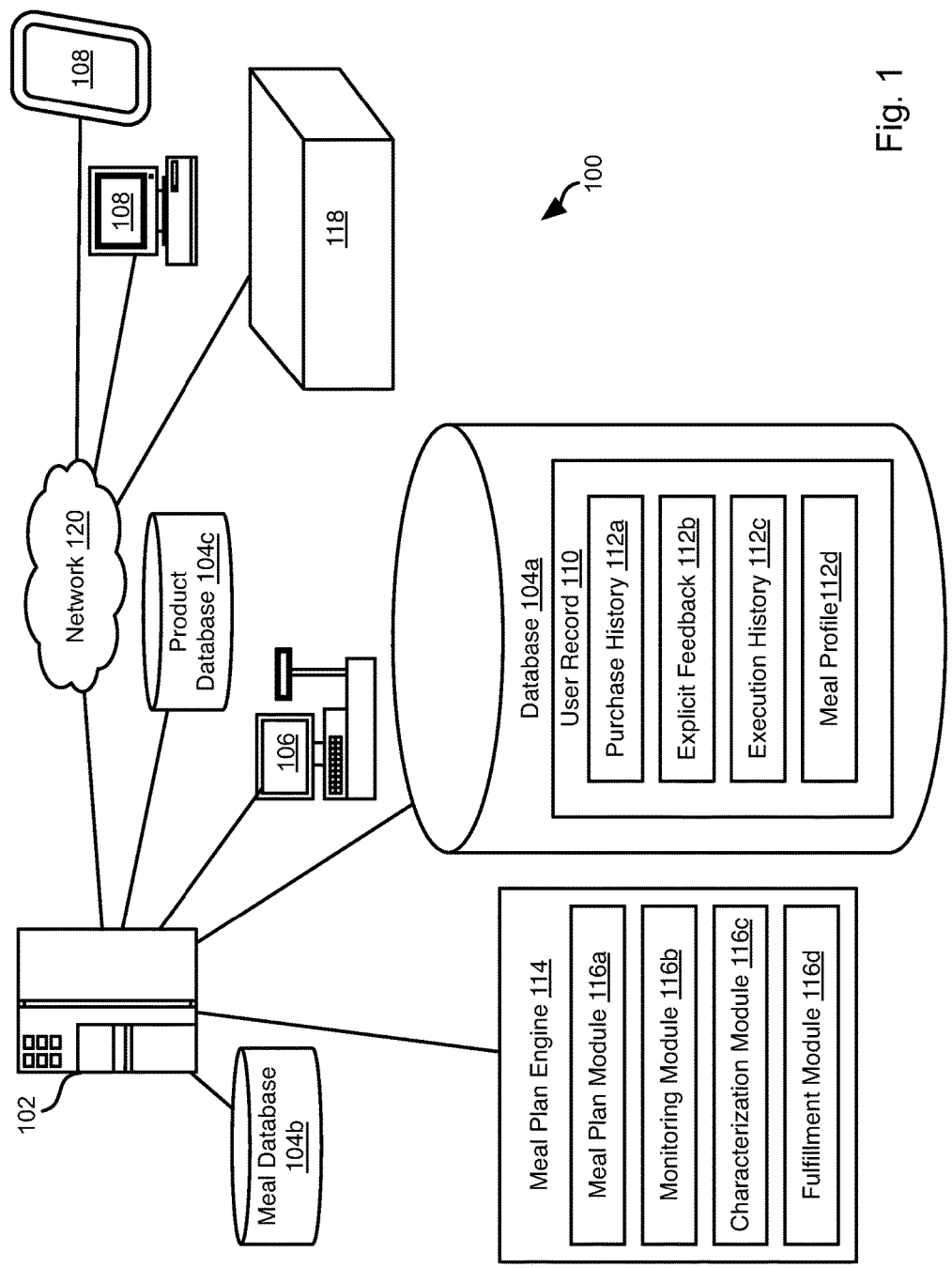
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be used to implement methods as described herein. The environment 100 may include a server system 102 associated with a corporate parent or controlling entity having one or more retail establishments associated therewith. The server system 102 may host or access a database 104a of user data, a meal database 104b, and a product database 104c, which are described in greater detail below. The retail establishments may house point of sale devices (POS) 106 on which transactions may be concluded. The POS 106 may also be part of an e-commerce system. The e-commerce system may include, for example, a web-application that permits customers to purchase various products and/or services over the Internet. POSs 106 in communication with the server system 102 may include POSs 106 associated with a warehouse store that is a separate entity or format than the retail establishments.

Online POSs 106 may interact with remote user computers 108. In particular, server system 102 may host a website that may be browsed by users on the user computers 108 and through which the users may invoke purchase and shipment of products in a product database 104c. The remote user computers 108 may be embodied as laptop or desktop computers, mobile phones, tablet computers, wearable computers, or other computing device.

Records of transactions may be transmitted to the server system 102 by the POSs 106 at one or more outlets, e.g. retail establishments, warehouse stores, and ecommerce systems. The records of various transactions from the various outlets may be associated to individual customers. Specifically, unique data such as a credit card number, address, username, membership number, and the like may be associated with a particular customer. Accordingly, transaction records including one or more items of this unique data may be associated with that user. For example, transaction records determined to be associated with a particular user may be stored in a user record 110 for that user in the database 104a, such as in a purchase history 112a of the user record 110.

The user record 110 for that user may further include records of other information received from a user or gathered from observation of user actions. For example, the user record 110, may include explicit feedback 112b, an execution history 112c, and a meal profile 112d. Explicit feedback 112b may include responses of the user to questions regarding the user's tastes (e.g. food style, ingredients, etc.) or specific meals presented to the user as part of a meal plan or actually prepared by the user. The manner in which the execution history 112c and meal profile 112d are obtained and used is described in greater detail below.

The server system 102 may execute a meal plan engine 114 executing the methods described herein. A meal plan module may select meal plans and meals for each customer of a plurality of customers based on the data contained in the user record 110. The meal plan module 116a may, for example, identify in the meal database 104b meals including ingredients and/or types of food that correspond to the meal profile 112d of a user and transmit media files from the meal database 104b that correspond to the meals to the user, e.g. a user device 106 associated with that user. The media file transmitted for a meal of the meal plan may include an instructional video that instructs the user how to prepare the meal.

A monitoring module 116b may receive notifications from user devices 108 regarding retrieval of deliveries of meal ingredients to the customer. In some embodiments deliveries may be made in crates 118 that includes a processor and wireless communication devices. The crates 118 may detect presence of proximity of a user device 108 and transmit a notification of the detection to the server system 102, thereby notifying the server system 102 that a delivery including in a crate 118 has been retrieved. Alternatively, the crates 118 may transmit a notification to a user device 108 upon detecting proximity of the user device 108. In response to this notification, the user device 108 may be programmed to report the notification to the server system 102 thereby indicating a delivery in the smart crate has been retrieved. In some embodiments, crates 118 may each have keypads and be configured such that upon input of a code, the crates 118 notify the server 102 of retrieval of the delivery contained in the crate, either directly or by notifying a user computer device 108 located proximate the crate, which then reports the notification to the server system 102.

The characterization module 116c may analyze the retrieval times of deliveries as detected by the monitoring module 116b. In particular, the characterization module 116c may train a retrieval model according to the retrieval times. The retrieval model may be trained using a data set including a plurality of data points that each includes a retrieval time for a delivery and the date of the delivery. The retrieval model may be trained by determining a distribution of the retrieval times having a delivery date on a particular week day. For example, a distribution of the retrieval times occurring on a Tuesday may be determined, and likewise for each day of the week. In other embodiments, a distribution of retrieval times occurring for a group of week days may be determined, e.g. a distribution of retrieval times having a delivery date falling on a weekday (Monday through Friday) may be determined and a second distribution of retrieval times having a delivery date falling on a weekend day (Saturday and Sunday) may also be determined. The characterization module may then determine for each weekday or range of weekdays a probable retrieval time according to the distribution for the each weekday or range of weekdays. For example, the probable retrieval time for a distribution may be retrieval time such that X percent of the retrieval times occur earlier than the probable retrieval time, where X is larger than 90 percent, preferably greater than 95 percent, and more preferably greater than 99 percent.

A fulfillment module 116d may invoke shipment of the ingredients for a meal as well as an amount of refrigerant sufficient to keep the ingredients at an appropriate temperature until the probable retrieval time for the day of the week of the ship according to the retrieval model. Specifically, the amount of refrigerant may be calculated by the fulfillment module as an amount of refrigerant required to keep contents of a crate 118 at or below an appropriate temperature from a time of packing (if a delivery truck is not refrigerated) or a time of delivery (if the delivery truck is refrigerated) to the probable time of retrieval given weather conditions that are expected to exist between the time of packing or delivery and the probable retrieval time. Weather conditions may be obtained from any source of meteorological data and may include expected ambient temperatures, cloud cover, precipitation, or other expected weather events that may affect the heat load on the crate 118. The expected warming of the contents of the crate 118 given weather between the packing or delivery times and the probable time of retrieval may be determined based on thermal conductivity of the crates 118 either determined experimentally or based on estimates using nominal values for materials and dimensions of the crates 118 using methods known in the art of thermodynamics.

The server system 102 may be in data communication with some or all of the POSs 106, user computers 108, and crates 118 by means of a network 120. The network 120 may include any wired or wireless connections and may include some or all of a local area network (LAN), wide area network (WAN), the Internet, or other type of network.

Figure 2:
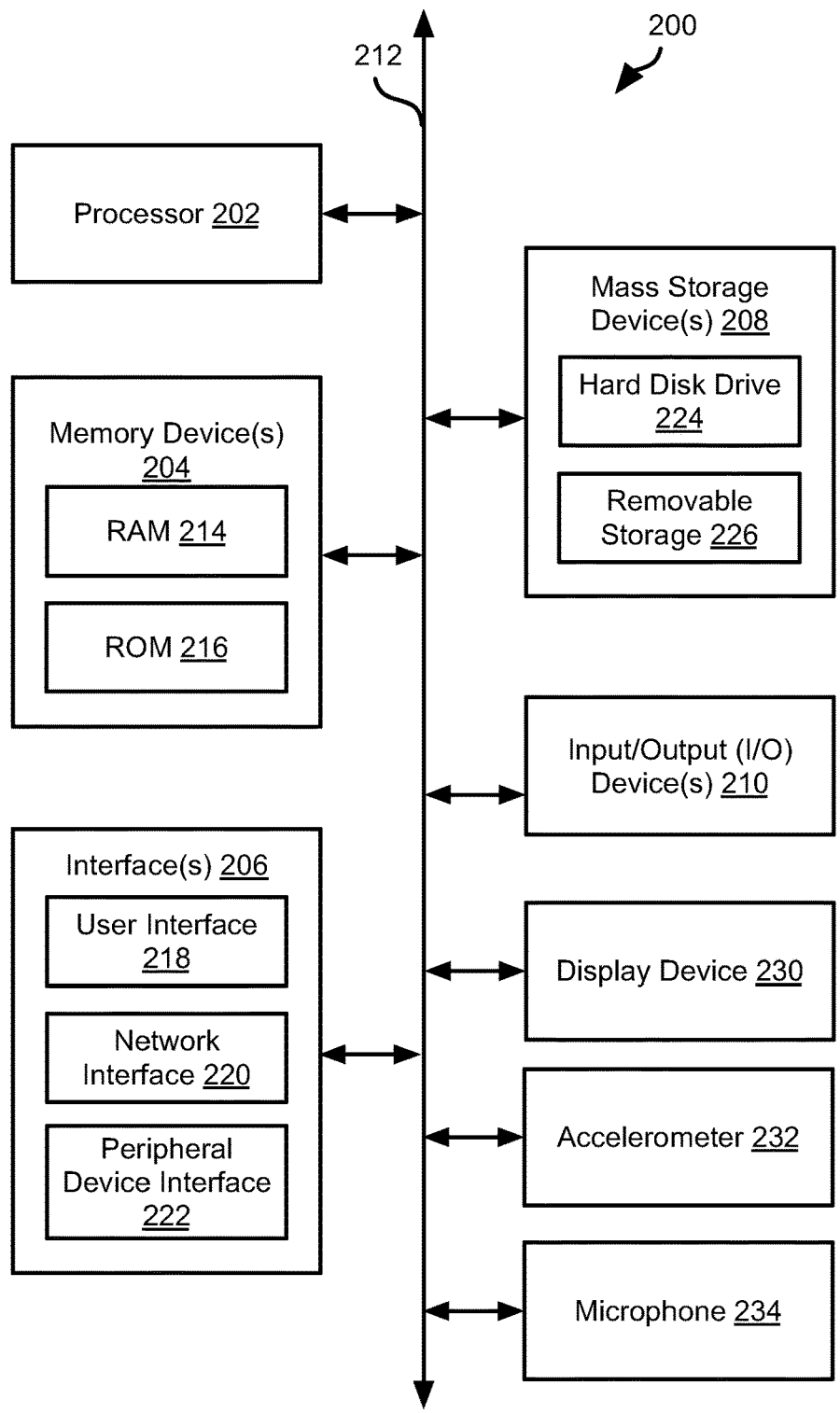
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server system 102, POSs 106, user computers 108, and crate 118 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

A computing device 200 implementing the user computers 108 may advantageously include one or more sensors. The output of these sensors may be used to determine whether a media file is viewed solely for inspiration or viewed during execution of a meal that the media file instructs how to prepare. In some embodiments, the sensors include an accelerometer 232 that detects acceleration of the user computer 108 in which it is included as well as the orientation thereof. In some embodiments, the sensors further include a microphone 234 capable of detecting sounds incident on the user computer 108.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
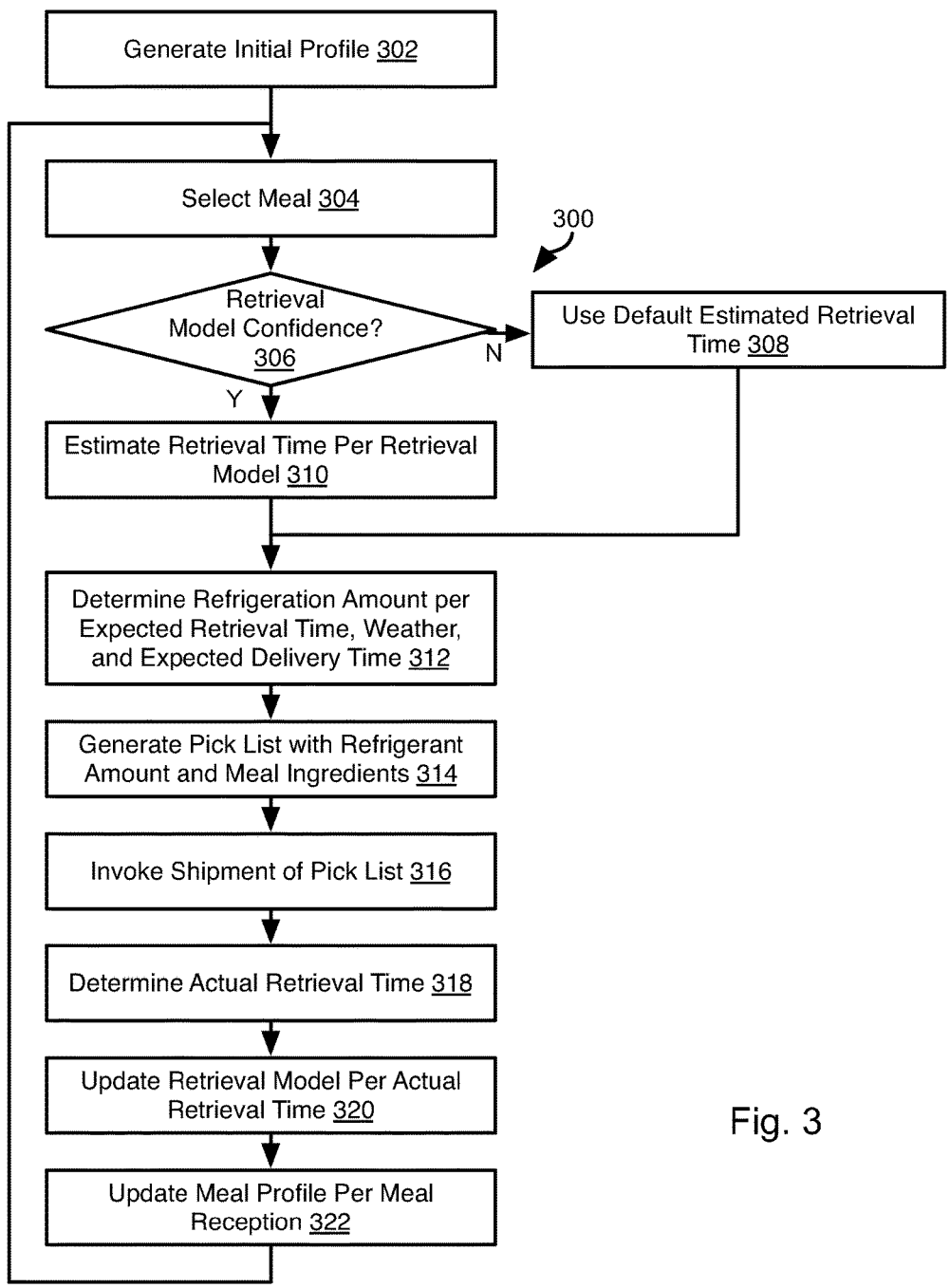
FIG. 3 is a process flow diagram of a method for invoking delivery of meal ingredients with an appropriate amount of refrigerant in accordance with an embodiment of the present invention.

Turning now to FIG. 3, the illustrated method 300 may be executed by the server system 102 with respect to each user record 110 of a plurality of user records, the user record representing a specific customer, family, or other entity, hereinafter "the user."

The method 300 may include generating 302 a profile, e.g. an initial meal profile 112d for the user. The initial meal profile 112d may include information known about a user from the user record 110 or from previous iterations of the method 300. In particular, the initial meal profile 112d may include inferring favorite ingredients or styles of food from the purchase history of the user.

For example, the initial meal profile 112d may include generating a taste profile of the user from the purchase history 112a. For example, each transaction of the purchase history 112a may include a listing of product identifiers. The method 300 may include mapping product identifiers or groups of product identifiers to a particular type of food. For example, product identifiers for tortillas, salsa, cilantro, limes, etc. may correspond to Mexican food. Product identifiers for soy sauce, bean sprouts, etc. may correspond to Chinese food. Of course, some ingredients may be used in multiple styles of cooking, such as cilantro, which may be used in both Mexican and Chinese food. Accordingly, determining a taste profile may include identifying groups of ingredients in the same or different transaction that overlap with a grouping of ingredients corresponding to a particular style of food. The style of food having the greatest number of products of a transaction included in its grouping of ingredients as opposed to other styles of food may be determined to be the style of food for that transaction. The style of food preference may be determined for each transaction or based on an aggregation of products for a plurality of transactions. For example, each transaction, or a group of transactions that are temporally proximate (e.g. within 5, 10, 15, or N days apart), may be analyzed and a style of food identified therefore. The styles of foods identified for a plurality of transactions or plurality of groups of transactions may be determined. The top M styles of foods, e.g. having the top M greatest numbers of transactions or groups of transactions mapped thereto may be selected as the customer's preferred styles of food. Attributes of meals determined from the ingredients may further include values of aesthetics, nutritional value, health benefits, and the like. Any methods known in the art may be used to determine the user's taste preference based on past purchases.

Generating 302 the meal profile 112d may include generating the taste profile as described above from a purchase history 112a as well as from explicit feedback 112b regarding meals presented to the user, e.g. including in the profile 112d data that indicates favorability of the user for attributes of meals the user indicated a liking for and indicates disfavor for attributes of meals the user indicated a dislike for. Generating 302 the profile may include storing in the profile 112d data indicating favoring of the user for attributes of meals actually executed by the user as determined according to the methods described herein. Generating 302 the profile may include storing in the profile 112d data indicating disfavoring of the user for attributes of meals not actually executed by the user as determined according to the methods described herein. The attributes of meals may include ingredients of the meals, a style of food of the meals, or any other attributes of the meal or portion of the meal.

The method 300 may further include selecting 304 a meal plan according to the meal profile 112d. For example, the meal database 104b may store a plurality of meals, i.e. data describing the meal including the ingredients, style of food, cooking methods, recipes, and instructional media files. Selecting 304 the meal plan may include selecting a set of meals that include ingredients, style of foods, and/or other attributes found in the meal profile 112d of the user. The meals selected 304 may also be selected so as to include diverse meals that provide an appropriate amount of variety while still corresponding to the meal profile 112d of the user. The selecting 304 of a meal plan may be performed by the meal plan module 116a.

The method 300 may include invoking shipment of some or all of the ingredients of the meal selected at step 304 on a date of the meal in a meal plan. For example, the method 300 may include evaluating 306 whether the retrieval model, as trained by the characterization module 116c, predicts with sufficient confidence the expected retrieval time on the date of the meal plan. For example, a confidence for the retrieval model may be a function of a number of data points used to train the retrieval model, i.e. a number of previous retrieval times detected. The confidence for the retrieval model may be a function of the variation of the data points used to train the retrieval model.

As noted above, a model may be trained for all data points or separate models may be trained for retrieval dates falling on different days of the week or different ranges of days of the week (i.e. weekdays and weekend days). Accordingly, a measure of variability such as a standard deviation may be calculated for the data points for a particular model. Where the measure of variability exceeds a variability threshold, the confidence for that particular model may be deemed too low for use in predicting a retrieval time. Likewise, a confidence score for a model may be a function of a number of data points used to train the model and the measure of variability. For example, the confidence score may be determined according to a function that increases with the number of data points used to train the model and decreases with increasing variability of the retrieval times indicated by the data points used to train the model. This confidence score may then be compared to a confidence score threshold. Where the confidence score a model is above or equal to the confidence score threshold, the model may be used to predict a retrieval time. Where the confidence score is below the confidence score threshold, then the model will not be used to predict the retrieval time in some embodiments.

If the retrieval model corresponding to the day of the week that the selected 304 meal is to be delivered is not found 306 to meet the confidence threshold condition, then a default estimated retrieval time may be used 308. For example, the default retrieval time may be the latest retrieval time recorded for that user, recorded for that user in a range of weekdays including the delivery date for the selected 304 meal, or recorded for the weekday of the delivery date for the selected 304 meal. The default retrieval time may be selected without reference to the particular user. For example, a worst case may be assumed to be 7 pm, 8 pm, or some other time before which a typical user has a very high likelihood of arriving home.

Where the retrieval model corresponding to the date of delivery for the selected 304 meal is determined 306 to meet the confidence threshold, then an estimated retrieval time may be estimated 310 according to that retrieval model. As noted above, the estimated retrieval time for a retrieval model may be retrieval time such that X percent of recorded retrieval times used to train the retrieval model occur are earlier than the estimated retrieval time, where X is larger than 90 percent, preferably greater than 95 percent, and more preferably greater than 99 percent.

In either case, the estimated retrieval time may be used to determine 312 an amount of refrigerant required to maintain a crate 118 containing the ingredients of the selected 304 meal below an appropriate temperature from an expected time of packing (if a delivery vehicle is not refrigerated) or an expected time of delivery (if the delivery vehicle is refrigerated) to the expected retrieval time. The expected packing time or delivery time may be determined according to a shipping schedule describing the delivery and that is accessed by the server system 102. The rate of heat transfer to the interior of the crate 118 between the expected packing/delivery time and the expected retrieval time may be calculated based on a heat load on the crate 118 and the insulative properties of the crate 118 (measured or calculated based on dimensions and materials of the crate 118). The heat load on the crate 118 in the period between the expected packing/delivery time and the expected retrieval time may be calculated based on ambient temperature during the period, solar radiation during the period, precipitation during the period, or other meteorological data that impacts heat transfer relative to the crate 118. The ambient temperature, solar radiation, precipitation, or other meteorological data expected to exist between the expected packing/delivery time and expected retrieval time at the delivery destination for the crate 118 may be retrieved by the server system 102 from a source of such data, e.g. a published weather reports accessible over the Internet.

Based on the heat load, the expected amount of refrigerant needed to maintain an appropriate temperature within the crate 118 may be determined 312. For example, the refrigerant may be ice and the expected amount may an amount of ice effective to maintain the contents of the crate 118 below an appropriate temperature given the heat load and insulative properties of the crate using the principles of thermodynamics as known in the art.

The method 300 may further include generating 314 a pick list listing both the ingredients of the selected 304 meal and the amount of refrigerant determined at step 312. For example, the refrigerant may be ice packs and the amount of refrigerant may be included in the generated 314 pick list as a number of ice packs to be included with the ingredients. The pick list may specify quantities of ice packs of different sizes in order to closer approximate the amount of refrigerant required, as determined at step 312.

The method 300 may further include invoking 316 shipment of the pick list. This may include outputting to a computing device or printer a graphical representation of the pick list to facilitate retrieval of the refrigerant and ingredients listed on the pick list. The pick list may be presented on a computing device as part of an interface that received user inputs checking off items of the pick list as they are retrieved.

Invoking 316 shipment may include programming a smart crate 118 with user information sufficient to enable the smart crate 118 to detect the user computing device 108 of the appropriate user for whom the delivery is intended. Invoking shipment may include programming the smart crate 118 to open for a key code associated with the appropriate user.

Invoking shipment 316 may include generating routing information, labels for a carrier, or other information required to perform shipment of the crate 118. Electronic messages to a carrier may also be sent at step 316 that instruct the carrier to pick up the package and may include an address or other information for the delivery of the crate 118 to the appropriate user.

The method 300 may further include determining 318 an actual retrieval time for the crate 118 for which delivery was invoked at step 316. This may include detecting retrieval according to any of the approaches described above with respect to the monitoring module, e.g. detecting proximity of the user device 108 to the crate 118, detecting input of a key code to the crate 118, or any of the approaches described above.

The method 300 may further include updating 320 the retrieval model corresponding to the date of the delivery invoked at step 316, e.g. the retrieval model including the day of the week on which the date of delivery falls. Updating 320 the retrieval model may include adding the retrieval time determined at step 318 to a set of data points used to train the retrieval model and then retraining the retrieval model using the augmented set of data points. In some embodiments, step 320 is performed for each retrieval time or every N data points, where N is some integer greater than 1, e.g. 7, 14, or some other value.

The method 300 may further include updating 322 the meal profile 112d according to the user's reception of the meal selected at step 304. User reception of the meal may be determined based on explicit feedback from the user, e.g. a survey transmitted by the server system 102 to the user and a response to the survey received from the user. In particular, the meal profile 112d may be updated to favor selection of meals having ingredients and styles of food similar to the selected 304 meal if the user reception is positive and to disfavor selection of meals having ingredients and styles of food similar to the selected 304 meal if the user reception is negative.

User reception of the selected 304 meal may be evaluated based on evaluation of user actions. For example, selecting 304 a meal may include transmitting a media file to the user device of the user. User actions with respect to that media file may be evaluated. If the user actions include playing back the media file with pausings corresponding to performance of cooking steps, then the media file may be determined to have been well received, i.e. actually executed by the user. If the user actions include no playback or playback with no pausing, then the media file may be deemed not to have been viewed to execute the meal and the selected 304 meal may be determined not to have been well received. Other actions may also be evaluated, such as sounds detected during playback, whether the user device 108 on which playback occurred was still during playback, or other user actions.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system for evaluating consumer behavior, the system comprising:

a customer knowledge database storing a customer profile for each customer of a plurality of customers, the customer profile for each customer including a purchase history of items purchased by each customer;

a plurality of electronic crates each comprising a volume configured to store meal ingredients during deliveries and a processor programmed to detect retrieval of deliveries made with the electronic crate;

a server system comprising one or more processors and one or more memory devices operably coupled to the one or more processors, the one or more memory devices storing executable and operational code effective to execute a supply chain engine comprising a meal plan module effective to generate, for each customer of the plurality of customers, a meal plan including meals including styles of food and ingredients corresponding to the customer profile of each customer;

a monitoring module effective to monitor times of retrieval of a plurality of completed deliveries to each customer of the plurality of customers via the plurality of electronic crates, each completed delivery including ingredients for a meal of the meal plan;

a characterization module effective to generate a retrieval model for each customer of the plurality of customers according to the times of retrieval for the plurality of completed deliveries for each customer based on at least one retrieval time of a completed delivery as detected by one or more of the plurality of electronic crates; and a fulfillment module effective to, for a current delivery:
   determine an expected delivery time for the current delivery corresponding to a time that one of the electronic crates is expected to leave a delivery vehicle;
   determine an expected retrieval time for the current delivery according to the retrieval model of each customer;

determine an expected ambient temperature between the expected delivery time and the expected retrieval time;

calculate an amount of refrigerating material required to maintain the current delivery at an appropriate temperature between the expected delivery time and the expected retrieval time according to the expected ambient temperature;

generate a pick list including the ingredients for a meal included in the current delivery and the amount of refrigerating material; and output the pick list to a representative for retrieval.

2. The system of claim 1, wherein the refrigerating material includes ice packs and wherein the fulfillment module is effective to calculate a number of ice packs required to maintain the current delivery at the appropriate temperature between the expected delivery time and the expected retrieval time according to the expected ambient temperature.

3. The system of claim 1, wherein the characterization module is effective to generate the retrieval model by calculating a distribution of the times of retrieval for the plurality of completed deliveries and determine the expected retrieval time from the distribution.

4. The system of claim 1, wherein the characterization module is effective to generate the retrieval model for each customer by, for each weekday, determining a distribution of the retrieval times for completed deliveries for each customer occurring on each weekday.

5. The system of claim 1, wherein the characterization module is effective to determine a confidence for the expected retrieval time for the retrieval model of each customer of the plurality of customers.

6. The system of claim 5, wherein the fulfillment module is further effective to ignore the expected retrieval time from the retrieval model if the confidence is below a threshold value.

7. The system of claim 1, wherein the fulfillment module is further effective to determine the expected retrieval time by selecting the expected retrieval time such that the expected retrieval time has an above threshold probability of being on or after each customer's arrival time according to a probability distribution for each customer, the probability distribution calculated according to the times of retrieval of the plurality of completed deliveries to each customer.

8. The system of claim 1, wherein the electronic crates further each comprise a wireless communication system and is further configured to notify the server system of delivery of the completed deliveries and current delivery in response to detecting proximity of a computing device associated with a customer of the plurality of customers to the wireless communication system.

9. The system of claim 1, wherein the monitoring module is further effective to monitor times of retrieval of the plurality of completed deliveries to each customer by, for each completed delivery, receiving notification from a user device indicating arrival of the user device at a residence of each customer on a date of each completed delivery and subsequent to an arrival time of each completed delivery.

10. A method for evaluating consumer behavior, the method comprising:

generating, by a server system, for each customer of a plurality of customers, a meal plan including a plurality of meals;

receiving notifications of delivery of the completed deliveries for each customer of the plurality of customers by receiving notifications from one or more electronic crates including a processor programmed to detect retrieval of the completed deliveries make in the electronic crate;

monitoring, by the server system, times of retrieval of a plurality of completed deliveries to each customer of the plurality of customers, each completed delivery including ingredients for a meal of the plurality of meals included in the meal plan for each customer;

generating, by the server system, a retrieval model for each customer of the plurality of customers according to the times of retrieval for the plurality of completed deliveries for each customer based on at least one retrieval time of a completed delivery as detected by the one or more electronic crates;

for each customer of the plurality of customers, fulfilling a current delivery to each customer by the server system by determining an expected delivery time for the current delivery corresponding to a time that one of the electronic crates is expected to leave a delivery vehicle;

determining an expected retrieval time for the current delivery according to the retrieval model of each customer;

determining an expected ambient temperature between the expected delivery time and the expected retrieval time;

calculating an amount of refrigerating material required to maintain the current delivery at an appropriate temperature between the expected delivery time and the expected retrieval time according to the expected ambient temperature;

generating a pick list including the ingredients for a meal included in the current delivery and the amount of refrigerating material; and outputting the pick list to a representative for retrieval.

11. The method of claim 10, wherein:

the refrigerating material includes ice packs;

calculating the amount of refrigerating material required to maintain the current delivery at the appropriate temperature between the expected delivery time and the expected retrieval time according to the expected ambient temperature comprises determining a number of ice packs.

12. The method of claim 10, wherein generating the retrieval model for each customer further comprises calculating a distribution of the times of retrieval for the plurality of completed deliveries of each customer and determining the expected retrieval time from the distribution.

13. The method of claim 10, wherein generating the retrieval model for each customer further comprises, for each weekday, determining a distribution for the retrieval times for the completed deliveries occurring on each weekday.

14. The method of claim 10, wherein generating the retrieval model for each customer further comprises determining a confidence for the expected retrieval time according to the retrieval model of each customer.

15. The method of claim 14, further comprising ignoring the expected retrieval time from the retrieval model if the confidence is below a threshold value.

16. The method of claim 10, wherein determining the expected retrieval time comprises selecting the expected retrieval time such that the expected retrieval time has an above threshold probability of being on or after each customer's arrival time according to a probability distribution for each customer, the probability distribution calculated according to the times of retrieval of the plurality of completed deliveries to each customer.

17. The method of claim 10, wherein the one or more electronic crates further each comprise a wireless communication system;
   wherein the method further comprises notifying, by the one or more electronic crates, the server system of delivery of the completed deliveries and current delivery in response to detecting proximity of a computing device associated with a customer of the plurality of customers to the wireless communication system.

18. The method of claim 10, further comprising, for each customer of the plurality of customers, receiving notification from a user device indicating arrival of the user device at a residence of each customer on a date of each completed delivery and subsequent to an arrival time of each completed delivery.

\* \* \* \* \*